(12) United States Patent
Bottorff et al.

(10) Patent No.: US 10,374,833 B2
(45) Date of Patent: Aug. 6, 2019

(54) MODIFYING AN ADDRESS TO FORWARD A PACKET TO A SERVICE FUNCTION

(71) Applicant: HEWLETT PACKARD ENTERPRISE DEVELOPMENT LP, Houston, TX (US)

(72) Inventors: Paul Bottorff, Roseville, CA (US); Donald Fedyk, Littleton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 26 days.

(21) Appl. No.: 15/504,257

(22) PCT Filed: Dec. 3, 2014

(86) PCT No.: PCT/US2014/068465
§ 371 (c)(1),
(2) Date: Feb. 15, 2017

(87) PCT Pub. No.: WO2016/089400
PCT Pub. Date: Jun. 9, 2016

(65) Prior Publication Data
US 2017/0288909 A1 Oct. 5, 2017

(51) Int. Cl.
*H04L 12/28* (2006.01)
*H04L 12/64* (2006.01)
*H04L 12/54* (2013.01)
*H04L 12/70* (2013.01)

(52) U.S. Cl.
CPC .......... *H04L 12/6418* (2013.01); *H04L 12/56* (2013.01); *H04L 2012/5625* (2013.01); *H04L 2012/5685* (2013.01)

(58) Field of Classification Search
CPC ................. H04L 12/6418; H04L 12/56; H04L 2012/5625; H04L 2012/5685
See application file for complete search history.

(56) References Cited

U.S. PATENT DOCUMENTS

| | | |
|---|---|---|
| 7,616,635 B2 | 11/2009 | Slaight |
| 2011/0292939 A1 | 12/2011 | Subramian |
| 2011/0310901 A1 | 12/2011 | Uchida et al. |
| 2012/0188990 A1 | 7/2012 | Botorff |
| 2013/0250958 A1 | 9/2013 | Watanabe |
| 2014/0019639 A1 | 1/2014 | Ueno |
| 2014/0133497 A1 | 5/2014 | Chapman |
| 2014/0195666 A1 | 7/2014 | Dumitriu et al. |
| 2014/0229945 A1 | 8/2014 | Barkai et al. |
| 2014/0241247 A1 | 8/2014 | Kempf et al. |

(Continued)

OTHER PUBLICATIONS

"Internet Drafts—Sorted by Date," Oct. 16, 2014, pp. 1-403.

(Continued)

*Primary Examiner* — Abdelnabi O Musa
(74) *Attorney, Agent, or Firm* — Hewlett Packard Enterprise Patent Department

(57) ABSTRACT

Some examples herein disclose identifying a service function chain based on a switch address from a packet. The examples disclose modifying the switch address to an address corresponding to a service function based on the identified service function chain. The examples also disclose forwarding the packet to the service function according to the modified switch address.

17 Claims, 5 Drawing Sheets

(56) References Cited

U.S. PATENT DOCUMENTS

| | | | | |
|---|---|---|---|---|
| 2016/0142321 A1* | 5/2016 | Gage | .................. | H04W 4/70 |
| | | | | 370/235 |
| 2016/0308981 A1* | 10/2016 | Cortes Gomez | ........ | H04L 67/16 |
| 2017/0214613 A1* | 7/2017 | Zhang | ................. | H04L 12/4633 |
| 2017/0302623 A1* | 10/2017 | Bifulco | .................. | H04L 45/64 |

OTHER PUBLICATIONS

Enabling Service Function Chains and Value-Added Services with Sandvine Divert, Nov. 24, 2014, pp. 1-16, Sandvine Inc.
David Dolson, "VLAN Service Function Chaining," Internet Draft, Feb. 14, 2014, pp. 1-9, IETF Trust.
International Search Report and Written Opinion, International Application No, PCT/US2014/068465, dated Aug. 21, 2015, pp. 1-10, KIPO.
J. Halpern and C. Pignataro, "Service Function Chaining (SFC) Architecture," Network Working Group, Internet Draft, Sep. 20, 2014, pp. 1-26, IETF Trust.
S.Machie, et. al., "Service Function Chains Using Virtual Networking" Oct. 2, 2014, 44 pages, IETF draft-Mackie-sfc-using-virtual-networking-00.

\* cited by examiner

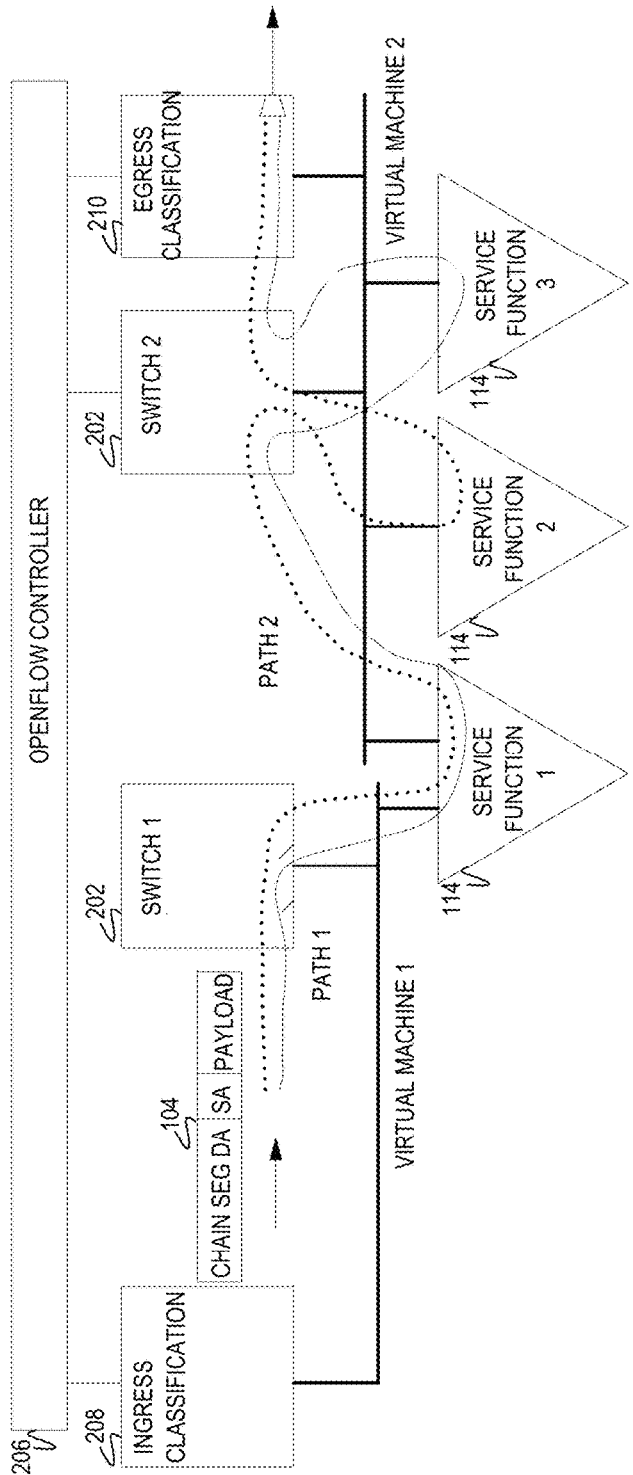
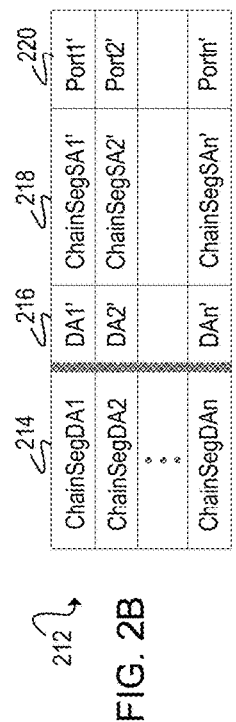
FIG. 2A
FIG. 2B

MODIFYING AN ADDRESS TO FORWARD A PACKET TO A SERVICE FUNCTION

BACKGROUND

Service functions are those services provided by a provider to process a data packet. These service functions may be performed on the data packet between networking components. As such, these service functions may provide an enhancement to network operations and/or provide additional services.

BRIEF DESCRIPTION OF THE DRAWINGS

In the accompanying drawings, like numerals refer to like components or blocks. The following detailed description references the drawings, wherein:

FIG. 2A is a block diagram of example networking system illustrating various paths for a packet to take from a networking component to various service functions as part of a service function chain;

FIG. 2B is a diagram of an example database for use by a networking component to identify a service function chain based on a switch address in a packet;

DETAILED DESCRIPTION

Figure 1:
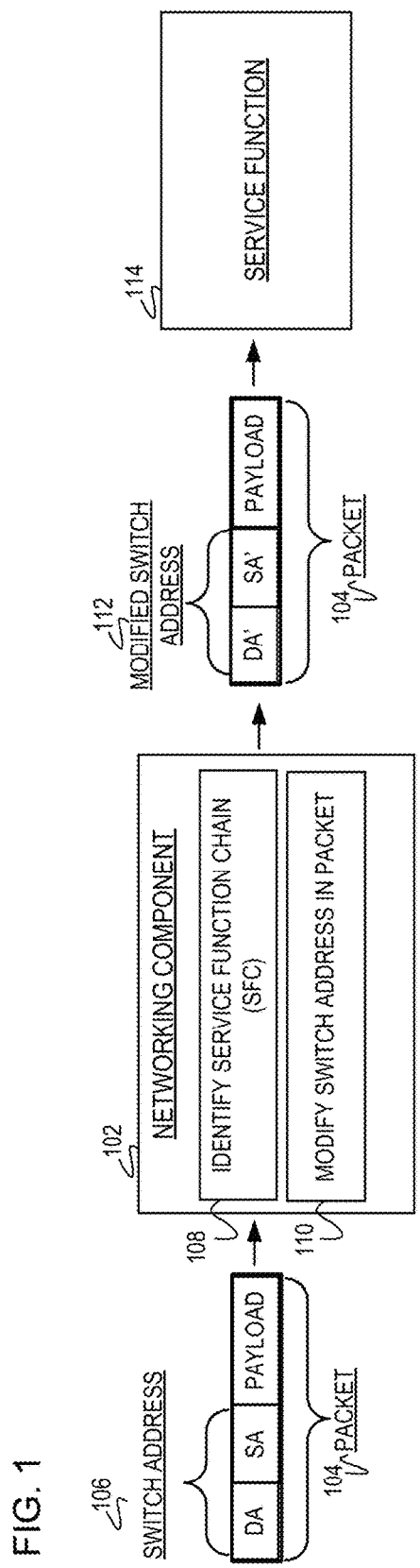
FIG. 1 is a block diagram of an example networking system including a networking component to modify a switch address and to route a packet according to a service function based on the modified switch address.

The service functions are those services, processes, operations, and/or functions which may be administered by a provider to add value to packet transportation and processing. For example, the service functions may include those services which add value, control quality of service, enhance privacy, and/or provide internal tracking mechanisms. Examples of the service function may include deep packet inspection (DPI), firewalls, tracking packet sizes, encryption/decryption, latency improvements, improvements in resolving addresses, improvements in transferring information to cover packet losses, network address translation, post-identification inspection, network forwarding policy, layer four-layer seven (L4-L7) switching, multiprotocol label switching (MPLS), virtual local area network (VLAN) switching, meta-data switching, hypertext transfer protocol (HTTP) enhancement, data caching, accounting, parental controls, call blocking, call forwarding, etc. The deployment of these service functions are based on the ability to create a service function chain and/or pipeline which are instantiations of instances of these service functions and the traffic flows through these service functions. As such, service function chain may include multiple service functions and specifies those service functions which are to be performed on a given packet during transportation.

Service function chaining is implemented today using a variety of techniques. The most common method is based on a hard wired static network configuration. When using this method changes in the service chain are very costly since they require physically re-wiring the network. Other methods have been proposed to solve the problems caused by hard wired configuration which use proprietary switching formats, meta-data switching, flow switching, etc. The resulting service function chaining may be highly complex and incompatible with existing infrastructure within a network. For example, the service function chaining may use newer protocol formats which may be impractical on existing infrastructure. Thus service function chaining may be infeasible on existing infrastructure. Additionally, a packet may be modified to route to particular service functions, but this may cause issues as the more the packet is changed, these changes may affect other networking aspects. For example, modifications to layers three through layers seven (L3-L7) may become complicated because packet modifications may cause further issues down the line in transporting the packet within the network.

To address these issues, some examples disclosed herein provide a mechanism to enable service function chaining in existing infrastructure. The examples disclose a networking component to identify a service function chain based on a switch address from a packet. The switch address which is delivered as part of the packet serves as a unique identifier for the networking component to determine a particular service function chain for processing a given packet. Upon identifying the service function chain, the networking component modifies the switch address within the packet to an address corresponding to a service function. Modifying the switch address, the networking component forwards the packet to the modified address corresponding to the service function. Modifications to the switch address provide compatibility of service function chaining on existing infrastructure. For example, when packets egress from the networking component, these packets with the switch address modifications are considered standard network frames without format change(s). Additionally, modifying the switch address provides the ability to insert and delete service function(s) with ease within the service function chains. This provides an additional level of control over the service function(s) performed on a given packet.

In other examples discussed herein, the packet is forwarded to a virtual machine hosting the service function. In this implementation, virtualizing the service function provides flexibility as the packet is not constrained by hardwired components hosting the service function.

In another example discussed herein, the modified switch address is modified within a layer two (L2) portion of the packet and as such may further include modifying a media access control (MAC) address. Modifying the L2 portion of the packet provides less risk as the modifications to the L2 portion is less likely to affect other networking aspects. Also, modifications to the MAC address enables the compatibility of the service function chaining on existing infrastructure as the existing infrastructure is equipped to handle MAC addresses.

Examples disclosed herein provide a mechanism in which a service function chain may be compatible on existing infrastructure. Additionally, the examples enable a flexibility for routing the packet to a particular service function.

Referring now to the figures, FIG. 1 is a block diagram of an example networking system including a networking component 102 to receive a packet 104 with a switch address 106. The networking component 102 receives the packet 104 and based on the switch address 106 as part of the packet 104, the networking component 102 identifies a service function chain at module 108. Upon identifying the service function chain at module 108, the networking component 102 modifies the switch address at module 110 to produce a modified switch address 112 in the packet 104. The modified switch address 112 indicates a location for the networking component 102 to forward the packet 104 accordingly. The service function chain may include those service function(s) 114 a networking carrier may wish to perform upon the packet 104 when routing between computer nodes in the networking system. As such, the service function chain includes the addresses of the locations of those service function(s) 114 to route the packet 104. The networking system as illustrated in FIG. 1 represents a data network in which networked computing devices (e.g., networking components) may exchange data in the form of the packet 104. These networked computing devices establish data connections in the form of networking links between nodes to route and/or forward the packet 104. Implementations of the networking system include, by way of example, a telecommunications network, Internet, Ethernet, wide area network (WAN), local area network (LAN), optic cable network, virtual network or other type of networking system which passes packets 104 between nodes.

The networking component 102 is the networked computing device which may establish the data connection with other networking components and/or forward the packet 104 accordingly. As such, the networking component 102 receives the packet 104 and based on the switch address 106 within the packet 104, the networking component 102 identifies the service function chain and modifies the switch address at modules 108-110. Implementations of the networking component 102 include a multi-port network device, multi-layer switch, media access control (MAC) switch, router, virtual switch or other type of networking component capable of receiving the packet 104 and modifying the switch address at module 110. Although FIG. 1 illustrates the networking component 102 as a single component, implementations should not be limited as the packet 104 may be routed among multiple networking component(s) as detailed in the next figure.

The packet 104 is received by the networking component 102 from which the switch address 106 produces the modified switch address 112. The packet 104 is considered a networking packet or data packet which is a formatted unit of data carried by the networking system. For example, the data packet 104 and/or data frame consists of wire formats for standardizing portions of the packet 104. The packet 104 consists of at least two kinds of data including network control information and user data (i.e., the payload). As such, the control information may further include the switch address 106. The control information provides data for the networking system to deliver the payload to the appropriate destination. For example, the control information may be part of an open systems interconnection (OSI) model and as such may include the data that characterizes and standardizes the internal communication functions by partitioning the network control into various abstract layers, such as layers one through layers seven (L1-L7). This control information may be found within the headers and/or trailers. In this example, the switch address 106 would be considered part of the layer two (L2) portion of the packet 104.

The switch address 106 is a unique identifier assigned within the packet 104 for communications on a physical networking segment. This unique identification of the switch address 106 enables the networking component 102 to uniquely identify the service function chain. Uniquely identifying the service function chain, the networking component 102 may identify the switch address(es) in which to modify for forwarding the packet 104 to the appropriate service function(s) 114. In one implementation, the switch address 106 is a media access control (MAC) address while in another implementation, the switch address 106 is part of the L2 portion of the packet 104.

At modules 108-110, the networking component 102 uses the switch address 106 to identify the service function chain. Based on the identification of the service function chain at module 108, the networking component 102 proceeds to modify the switch address at module 110 to produce the modified switch address 112. In one implementation of module 108, the networking component 102 utilizes a database to locate the switch address 106 within the database and the corresponding service function chain. The database may include various switch address(es) 106 and the various service function chains. Thus, the networking component 102 utilizes the switch address 106 to identify the particular service chain. In an implementation of module 110, the networking component 102 modifies both the destination address and the source address of the packet 104. The modules 108 and 110 may include, by way of example, instructions (e.g., stored on a machine-readable medium) that, when executed (e.g., by the networking component 102), implement the functionality of modules 108 and 110. Alternatively, or in addition, the modules 108 and 110 may include electronic circuitry (i.e., hardware) that implements the functionality of modules 108 and 110.

The modified switch address 112 represents the address at which the service location 114 is located. Upon identifying the service function chain at module 108, the networking component 102 changes the switch address 106 to produce the modified switch address 112. Upon identifying the service function chain at module 108, the networking component 102 identifies those addresses representing the various location(s) of the service function(s) 114 in the service function chain. As such, the networking component 102 identifies the modified switch address from the database to produce the modified switch address 112. For example, the networking component 102 uses the switch address 106 (destination address (DA) and source address (SA)) to identify the service function chain. The service function chain identifies the modified switch address 112 (DA' and SA') for the networking component 102 to create the modified switch address 112. The modified switch address 112 directs the networking component 102 to the location in which to route the packet 104. In another implementation, the modified switch address 112 is produced as part of the L2 portion of the packet 104.

The service function 114 is provided by the network carrier for processing the packet 104. As such, the service function 114 is a service the networking carrier wishes to inject between networking nodes during transportation of the packet 104. Each service function 114 represents at least one segment of the service function chain. For example, the service function chain may consist of various service function(s) during transportation of the packet 104. In this manner, the service function 114 represents at least one of these various service function(s), thus creating a hop which performs the service function 114 on the packet 114. The modified switch address 112 corresponds to the location and identity of the service function 114. In one implementation, the modified switch address 112 includes the modified destination address (DA') indicating the location of the service function 114. In another implementation, when the service function 114 is complete, a virtual machine and/or proxy routes the packet 104 to the modified source address (SA').

FIG. 2A is a block diagram of an example networking system illustrating various paths (Path 1 or Path 2) for a packet 104 to take from a networking component (e.g., Switch 2) to various service functions (Service Function 1-Service Function 3) as part of a service function chain. The networking system includes an ingress classification 208 to receive the packet 104 and route to the networking component 202 (e.g., Switch 1). In this implementation, the ingress classification 208 receives the packet 104 without "ChainSegDA," switch address. The ingress classification 208 determines the networking component 202 to forward the packet 104 based on an inspection of the user data (i.e., payload) in the packet 104. The ingress classification 208 identifies the packet 104 through a formatted data unit, such as a header, tail, and/or other identifying information. The identifying information matches ingress classifier policy indicates to the ingress classification 208 that a given packet should undergo at least one service function 114 and as such is part of the service function chain. For example, the ingress classification 208 reconstructs the application in which to terminate a transmission control protocol (TCP) transport and builds an application extensible markup language (XML) webpage to then use a key in the XML to determine the chain in which to forward the packet 104. Upon identifying the chain in which to forward the packet 104, the ingress classification 208 builds or modifies at least one packet to be directed to the service function chain. In this example, the ingress classification 208 creates the packets 104 with a "ChainSegDA," determined by the ingress classifier policy 208. Determining the packet 104 should undergo the service function(s) 114 number 1 and 3, the ingress classifier identifies an address of the networking component and path 1 at the head of the chain and thus forwarding the packet 104 to that networking component and path.

At this first switch 202 (Switch 1), a switch address within the packet 104 is modified in accordance with the identified service function chain. The switch address within the packet 104 may be modified according to a database 212 as illustrated in FIG. 2B. This database 212 may be constructed to at least one of the switches 202 (Switch 1 and/or Switch 2) from an openflow controller 206. Enabling the openflow controller 206 to provide the database 212 to at least one of the switches 202, allows a network carrier to decide which service function(s) 114 to perform on a given packet 104. For example, the service function chain may include a single service function 114 or combination of service functions 114 (Service Function 1, Service Function 2, and/or Service Function 3). Each service function 114 represents a different service provided by the networking carrier to process the packet 104 during transportation. For example, the first service function (Service Function 1) may include a deep packet inspection, while the second service function (Service Function 2) may determine an internal housekeeping function for billing such as the billable size, etc., and the third service function (Service Function 3) might provide a service to improve quality enhancement to the packet 104. Each of the service function(s) may reside on a virtual Ethernet. The virtual Ethernet (Virtual Ethernet 1 and/or Virtual Ethernet 2) represent a virtual machine which may host each of the service function(s) 114. These virtual machines may host multiple service functions 114 or may host an individual service function 114.

Each path (Path 1 or Path 2) for the packet 104 depends on which service function chain is identified. Each service function chain may include different combinations of the service functions 114. For example, the first path (Path 1) of the packet 104 proceeds to the first switch 202 (Switch 1), the first service function 114 (Service Function 1), the second switch 202 (Switch 2), the second service function (Service Function 2), back to the second switch 202 (Switch 2), and then the third service function 114 (Service Function 3) prior to egress at the egress classification 210. In another example, the second path (Path 2) of the packet 104 takes fewer hops or service function(s) than the first path. In this example, the second path (Path 2) proceeds to the first switch 202 (Switch 1), the first service function 114 (Service Function 1), and the second switch 202 (Switch 2) prior to egress at the egress classification 210.

The egress classification 210 is a component within the networking system which receives the packet 104 upon operation of the service function(s) 114 and routes the packet 104 upon egress of the networking system within FIG. 2A. In one implementation, the egress classification 210 may determine the port in which to egress the packet 104.

As explained earlier, the database 212 may be used to identify or lookup the service function chain and the addresses associated with particular service function(s) based on the switch address (ChainSegDA) within the packet 104. This is described in detail in FIG. 2B.

FIG. 2B is a data table of an example database 212 for use by a networking component (e.g., switch 202) to identify a service function chain from a switch address 214 in a packet 104. The networking component constructs the database 212 from the openflow controller 206 for identifying which particular service function chain to implement for a given packet. The networking component identifies the switch address from the given packet 104. The switch address 214 is a unique identifier for the networking component to use for locating the corresponding service function chain. The service function chain includes a destination address 216, a source address 218, and/or which port 220 in which to forward the packet 104. Identifying the service function chain using this switch address, the networking component uniquely identifies the service function chain from the database 212 and the particular addresses 216 and 218 associated with the service function 114. For example in the database 212, the switch addresses 214 for various packets include: ChainSegDA1, ChainSegDA2, and ChainSegDAn. Each of the switch addresses 214 illustrate a chain segment destination address as provided in each packet 104. Using this chain segment destination address 214, the networking component determines a subsequent destination address 216 (DA1', DA2', and DAn') and a subsequent source 218 (ChainSegSA1', ChainSegSA2', and ChainSegSAn'). Thus, the switch destination address (ChainSegDA1, ChainSegDA2, and ChainSegDAn) determines the addresses 216 and 218 in which to modify the switch address 214 within the packet to the next destination address 216 and the next source address 218. The subsequent destination address 216 (DA1', DA2', and DAn') is the address to forward the packet 104 for performance of the service function 114. The modified source address 218 (ChainSegSA1', ChainSegSA2', and ChainSegSAn') is the address in which the service function, a proxy and/or virtual machine hosting the service function 114 forwards the packet 104 upon the performance of the service function 114. In another implementation, the networking component uses both the switch destination address 214 and a switch source address (SA) within the packet 104 to determine the addresses 216 and 218 in which to modify the switch address 214. In addition, the database 212 includes the port 220 connected to the virtual machine and/or virtual network for forwarding the packet 104 to the service function 114. In further implementations, the database 212 may include an entry specifying a direction of the packet 104.

Figure 3:
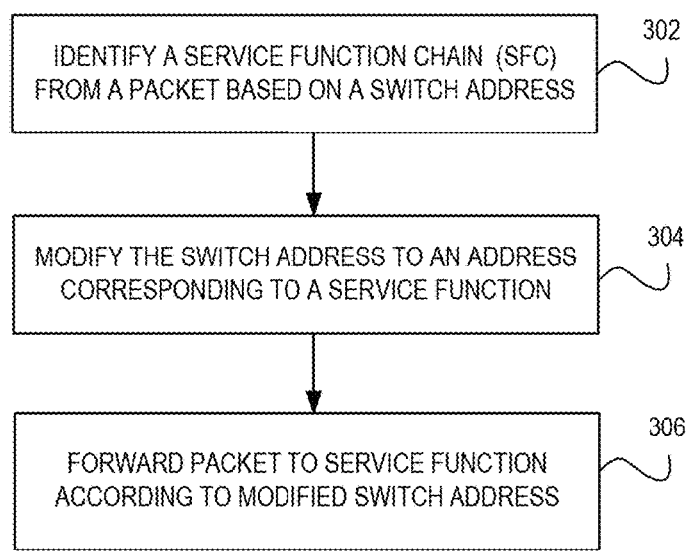
FIG. 3 is a flowchart of an example method executable by a networking component to modify a switch address from a packet to correspond to an address of a service function and to forward the packet to the service function.

FIG. 3 is a flowchart of a method executable by a networking component to forward a packet to a service function in accordance with a modified switch address. The networking component receives the packet and from the packet determines a switch address. In one implementation, the switch address may be found in the layer two (L2) portion of the packet. As such in this implementation, the packet may be formatted for compliance with IEEE 802® standards. In other implementations the packet is in a format such as an open systems interconnection model (OSI). Upon receiving the packet, the networking component distinguishes the switch address from other information included in the packet. Utilizing the switch address, the networking component identifies the service function chain. In one implementation, the service function chain includes at least one service function which may be provided to the packet when routing the packet from node to node within a networking system. In another implementation, the service function may be null within the service function chain so the next hop (e.g., subsequent location) in the chain is the egress of the packet. Identifying the service function chain, the networking component modifies the switch address to correspond to the service function. Modifying the switch address, the networking component forwards the packet to the service function according to the modified switch address. In discussing FIG. 3, references may be made to the components in FIGS. 1-2 to provide contextual examples. In one implementation, the networking component 102 as in FIG. 1 executes operations 302-306 to modify the switch address in the packet and forward the packet in accordance with the modified switch address. Further, although FIG. 3 is described as implemented by a controller, it may be executed on other suitable components. For example, FIG. 3 may be implemented in the form of executable instructions on a machine-readable storage medium 504 as in FIG. 5.

At operation 302, the networking component identifies the service function chain based on the switch address provided in the packet. At operation 302, the networking component identifies the switch address from the packet to determine a particular service function chain. The service function chains are considered those service functions (e.g., processes) which a networking carrier may wish to provide for a particular packet. As such, upon the networking component receiving the packet, the networking component may further identify which packets to process to which service function chains. For example, each packet received by the networking component may include the switch address indicating the particular service function chain among multiple service function chains. Thus, utilizing the switch address from the packet, the networking component identifies the service function chain in which to process that packet. In one implementation, the networking component may construct a database from an openflow controller. The database includes at least one service function chain so the networking component may use the database to identify the service function chain which corresponds to the switch address provided as part of the packet. In this implementation, the database includes the switch address for the networking component to look up and the corresponding service function chain. The service function lists the corresponding destination address and source address for which to modify the packet.

At operation 304, the networking component modifies the switch address within the packet as received at operation 302. The networking component modifies the switch to an address corresponding to the service function. The service function is a considered a segment or process as part of the service function chain in which to perform the particular service. For example, the networking carrier may desire to improve the quality of service (QoS) to particular packets as they arrive at the networking component. Thus, the address in which to forward the packet is modified so the service function (e.g., Qos) may be performed. In this implementation, the service function is determined according to the identified service function chain at operation 302. The address corresponding to the service function may be retrieved by the networking component from the database. These addresses are programmed in the database to identify the destination address of where to forward the packet. In another implementation, the switch address in the packet is modified to include both the destination address to the service function and the source address. The destination address includes the address to the service function. The source address is the next address in which identifies the service function may decide to forward the packet upon completion of processing the packet. In this implementation, both the destination address and the source address are modified in the layer two (L2) portion of the packet. Modifying the outer L2 portion of the packet rather than deeper portions of the packet (L2-L7) provides fewer complications in the networking system. For example, modifying the outer L2 portion of the packet provides less risk in affecting other networking aspects within the system as providing a more straightforward approach to modification of the switch address. Modifying the switch address within the packet, the networking component may proceed to forward the packet to that modified switch address to perform the service function.

At operation 306, the networking component proceeds to forward the packet to the modified switch address. In this implementation, the networking component forwards the packet to the modified destination address. The modified destination address is the address of the service function. Thus, modifying the switch address at operation 304, enables the networking component to forward the packet to at least one of the service functions within the identified service function chain. In another implementation, the networking component forwards the packet to a virtual machine hosting the service function. In this implementation, the packet may be forwarded to the virtual machine residing on the networking component or may be forwarded to another networking component hosting the virtual machine.

Figure 4:
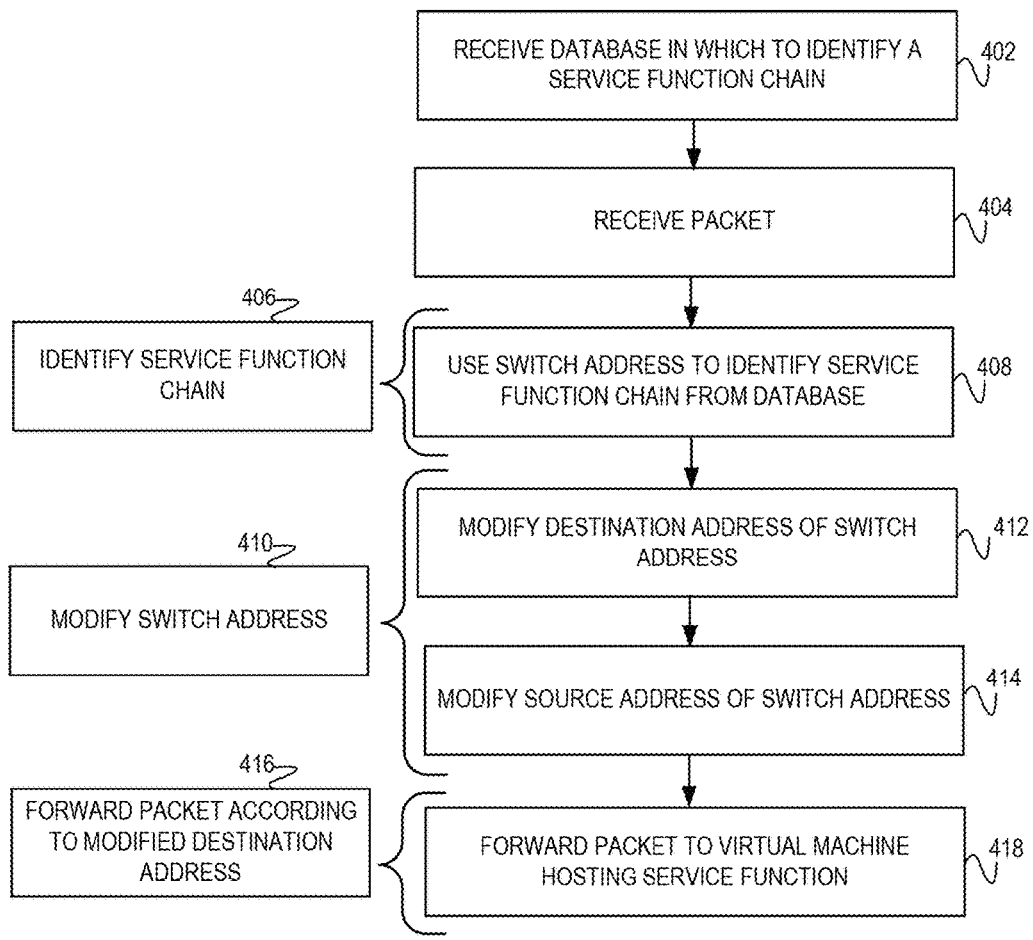
FIG. 4 is a flowchart of an example method executable by a networking component to forward a packet to a virtual machine hosting a service function, the networking component forwards the packet to the virtual machine based on a modified destination address of the packet.

FIG. 4 is a flowchart of an example method executable by a networking component to forward a packet to a virtual machine hosting a service function. The networking component constructs a database in which to identify a service function chain. Constructing the database, the networking component may receive the packet. From the packet, the networking component ascertains a switch address to identify a corresponding service function chain from the database. From identifying the service function chain, the networking component modifies the switch address in the packet to correspond to a service function to process the packet. The service function is considered a segment of the service function chain, in that the service function chain may specify various service function(s) which should be performed on the packet. In one implementation, the networking component modifies both a destination address and a source address as part of the switch address in the packet. The modified destination address and the modified source address may be determined from the identified service function chain. In this manner, the modified destination address directs the networking component of where to route the packet to perform the service function. The modified source address directs a virtual machine hosting a service function where to route the packet upon the processing the service function. Upon modifying the switch address within the packet, the networking component forwards the packet to the virtual machine corresponding to the modified destination address. In discussing FIG. 4, references may be made to the components in FIGS. 1-2 to provide contextual examples. In one implementation, the networking component 102 as in FIG. 1 executes operations 402-418 to modify the switch address in the packet and forward the packet in accordance with the modified switch address. In another implementation, a networking switch executes operations 402-418 to forward the packet in accordance with the modified switch address. Further, although FIG. 4 is described as implemented by a controller, it may be executed on other suitable components. For example, FIG. 4 may be implemented in the form of executable instructions on a machine-readable storage medium 504 as in FIG. 5.

At operation 402, the networking component constructs the database from the openflow controller or other automated means. The database may include the service function chain(s) which specifies addresses for particular service functions. The database enables the networking component to identify the service function chain according to the switch address in the packet. In one implementation, an administrator may specify which the particular addresses to correspond to the service function(s) as part of the service function chain(s). In this implementation, the openflow controller specifies the address(es) of the service function(s) which are placed in the database. This allows a network carrier to perform particular service function(s) on specific packets as they arrive at the networking component.

At operation 404, the networking component receives the packet. At operation 404, upon receiving the packet, the networking component may determine which packet among multiple packets should be processed in accordance with the service function chain. In this implementation, the packet may include header information for identifying that particular packet for service function processing. Upon receiving the packet, the networking component may proceed to identify the particular service function in which to process the packet.

At operation 406, the networking component identifies the service function chain from the database. The networking component identifies the switch address from the packet and utilizing the switch address, the networking component finds the corresponding service function from the database. Operation 406 may be similar in functionality to operation 302 as in FIG. 3.

At operation 408, the networking component utilizes the switch address in the received packet to identify the service function chain from the database. The switch address may be located in the layer two (L2) portion of the packet. Thus, the networking component may identify the switch address from the packet. In another implementation, the switch address includes a media access control (MAC) switch address. Using the switch address from the packet, the networking component may locate the service function chain within the database.

At operation 410, the networking component modifies the switch address within the packet. The switch address is modified to the address corresponding to the service function for processing the packet. The modified address is included as part of the service function chain in the database. As such, when the networking component identifies the service function chain, the networking component may retrieve the address to which to modify the switch address. Accordingly, this modified address directs the networking component on where to forward the packet as to perform the service function. In one implementation, the networking component modifies the destination address and the source address within layer two (L2) of the packet as at operations 412-414. Operation 410 may be similar in functionality to operation 304 as in FIG. 3.

At operation 412, the networking component modifies the destination address within the packet to redirect the packet to the modified destination address. The modified destination address indicates the location of where to route the packet. In one implementation, the modified destination address corresponds to which service function to route the packet.

At operation 414, the networking component modifies the source address within the packet to direct the service function to route the packet to the modified source address. The modified source address is considered a new source address in which the virtual machine hosting the service function may forward the packet to upon processing of the service function.

At operation 416, the networking component forwards the packet to the modified destination address, thus directing the packet to the service function which corresponds to the modified destination address. In one implementation, the networking component forwards the packet to the modified destination address, thus forwarding the packet to the virtual machine hosting the virtual machine as at operation 418. Operation 416 may be similar in functionality to operation 308 as in FIG. 3.

At operation 418, the networking component forwards the packet to the virtual machine hosting the service function. The networking component forwards and/or routes the packet to the modified destination address which corresponds to the virtual machine hosting the service function. Upon the virtual machine performing the service function, the virtual machine may proceed to route the packet to the modified source address. Upon reaching the device supporting the modified source address which may include the networking component or the different networking component, the modified destination address and the modified source address may be re-modified to route the packet to the next service function. In an implementation, the virtual machine may be hosted in connection with the networking component, thus routing the packet to the virtual machine hosted by the networking component. In another implementation, the virtual machine may be hosted on a different networking component, thus the packet may be routed to the different networking component hosting the virtual machine.

Figure 5:
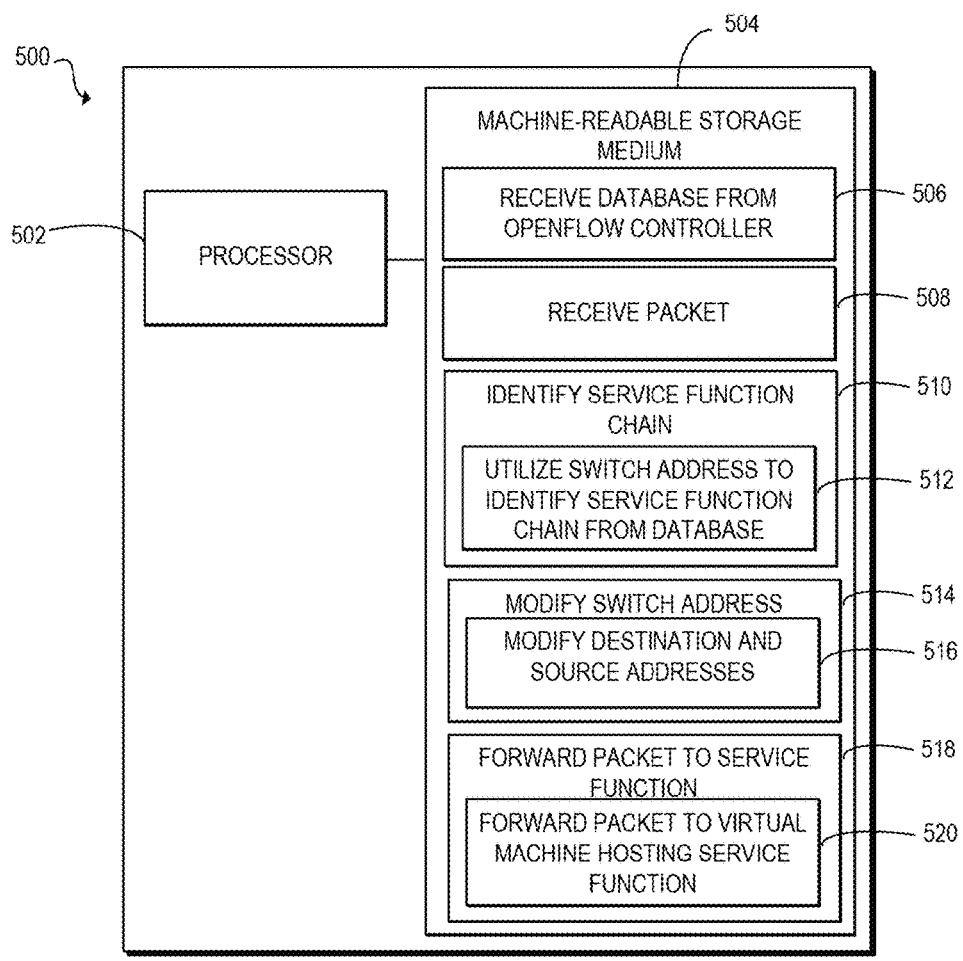
FIG. 5 is a block diagram of an example computing device with a processor to execute instructions in a machine-readable storage medium for modifying a destination address and a source address in a layer two (L2) portion of a packet and forwarding the packet to a service function based on the modified destination address.

FIG. 5 is a block diagram of computing device 500 with a processor 502 to execute instructions 506-520 within a machine-readable storage medium 504. Specifically, the computing device 500 with the processor 502 is to forward a packet with a modified switch address (e.g., MAC switch address) to a service function. The service function is considered a segment in a service function chain. As such, the modified switch address corresponds to an address of the service function in which to forward the packet accordingly. Although the computing device 500 includes processor 502 and machine-readable storage medium 504, it may also include other components that would be suitable to one skilled in the art. For example, the computing device 500 may include an additional processing component and/or storage. In another implementation, the networking component 102 as in FIG. 1 executes instructions 506-520. The computing device 500 is an electronic device with the processor 502 capable of executing instructions 506-520, and as such embodiments of the computing device 500 include a mobile device, server, data center, networking device, client device, computer, or other type of electronic device capable of executing instructions 506-520. The instructions 506-520 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processor 502 may fetch, decode, and execute instructions 506-520 to identify the service function chain using a database and to modify the switch address to correspond to the segment (i.e., service function) of the service function chain. Upon modifying the switch address, the processor 502 may execute the instruction to forward the packet to the service function corresponding to the modified switch address. In one implementation, upon executing instructions 506-508, the processor 502 may execute instruction 510 through the execution of instruction 512. In another implementation upon executing instructions 506-510, the processor 502 may execute instruction 512 through the execution of instruction 514. In a further implementation, upon execution of instructions 506-512, the processor 502 executes instruction 514 through the execution of instruction 516. Yet in another implementation, the processor 502 executes instruction 518 through execution of instruction 520. Specifically, the processor 502 executes instructions 506-520 to: construct a database from an openflow controller or other means, the database includes the switch address with the corresponding service function chain for identification; receive the packet with the switch address; identify the service function chain corresponding to the switch address in the packet, the service function chain is identified from the database; use the switch address to identify the specific service function chain from the database; modify the switch address upon identification of the specific service function chain; modification of the switch address includes the modification of the destination address and the source address in the packet; forward the packet with the modified switch address to the service function as the segment within the service function chain; and forward the packet to a virtual machine corresponding to the modified switch address, specifically, the virtual machine hosting the service function.

The machine-readable storage medium 504 includes instructions 506-520 for the processor 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

We claim:

1. A system comprising:
    a networking computing device to:
        identify a service function chain based on at least one of a source address and a destination address contained in a packet;
        modify the destination address and the source address of the packet to a modified destination address and a modified source address, respectively, the modified destination address corresponding to a service function and the modified source address corresponding to and identifying a successive address to which the packet is destined immediately following execution of the service function, wherein the service function is a segment within the service function chain and wherein the successive address is an address of a successive switch; and
    a port coupled to the networking computing device to forward the packet to the service function based on the modified destination address.

2. The system of claim 1 comprising:
    an ingress classifier to:
        identify the packet as part of the service function chain;
        determine an address to the networking component; and
        route the packet to the networking component.

3. The system of claim 1 comprising:
    a virtual machine to:
        host the service function at the modified destination address; and
        route the packet to the successive address using the modified source address.

4. The system of claim 1 comprising:
    an openflow controller to:
        provide a database to the networking component for identifying the service function chain from the database.

5. The system of claim 1, wherein the successive address is for a computer network device that does not host a service function.

6. The system of claim 1, wherein the successive switch is different than the network computing device.

7. A non-transitory machine-readable storage medium comprising instructions that when executed by a processing resource cause a computing device to:
    identify a service function chain based on a layer two (L2) portion of a packet;
    modify a destination address and a source address on the L2 portion of the packet based on the identified service function chain, the modified destination address corresponding to an address of a service function wherein the service function is a segment within the service function chain, the modified source address corresponding to and identifying a successive address to which the packet is to be forwarded by the service function following processing of the packet by the service function, wherein the successive address is an address of a successive switch; and forward the packet to the service function corresponding to the modified destination address.

8. The non-transitory machine-readable storage medium of claim 7 comprising
instructions that when executed by the processor resource cause the computing device to:
receive a database, prior to identification of the service function, in which to identify the service function chain according to the L2 portion of the packet.

9. The non-transitory machine-readable storage medium of claim 7 wherein the instructions to identify the service function chain based on the L2 portion of the packet comprise instructions that when executed by the processor resource cause the computing device to:
identify from the L2 portion of the packet, the destination address and the source address;
utilizing the destination address and the source address, identify from a database the
service function chain.

10. The non-transitory machine-readable storage medium of claim 7 wherein the service function forwards the packet to the successive address.

11. The non-transitory machine-readable storage medium of claim 7 wherein the instructions to forward the packet to the service function corresponding to the modified destination address comprise instructions that when executed by the processor resource cause the computing device to:
forward the packet to a virtual machine hosting the service function.

12. A method, executable by a networking component, the method comprising:
identifying a service function chain based on a at least one of a source and a destination address contained in a packet;
modifying the destination address of the packet to a first address corresponding to a-service function based on the identified service function chain, wherein the service function is a segment within the identified service function chain;
modifying the source address of the packet to second address corresponding to and identifying a successive address to which the packet is destined immediately following execution of the service function, wherein the successive address is an address of a successive switch; and
forwarding the packet to the service function according to the modified destination address.

13. The method of claim 12 wherein forwarding the packet to the-service function according to the modified destination address comprises:
forwarding the packet to a virtual machine hosting the service function.

14. The method of claim 12 comprising:
receiving a database, from an openflow controller, in which to identify the service function chain according to the source address; and
receiving the packet.

15. The method of claim 12 wherein identifying the service function chain from the packet based on the source address comprises:
using the source address to identify the service function chain from a database, the
service function chain includes the modified destination address and the modified source address.

16. The method of claim 12 wherein the service function chain includes multiple
segments for performing various service functions on the packet.

17. The method of claim 12 further comprising forwarding the packet from a service function address at which the service function is executed to the successive address which is different from the service function address.

* * * * *